April 28, 1959 R. J. GEARY 2,884,022
PLANT-POTTING MACHINE
Filed Aug. 16, 1954 5 Sheets-Sheet 1

FIG. I.

INVENTOR
ROBERT J. GEARY
BY *Morton Amster*
HIS ATTORNEY

April 28, 1959  R. J. GEARY  2,884,022
PLANT-POTTING MACHINE
Filed Aug. 16, 1954  5 Sheets-Sheet 2

INVENTOR
ROBERT J. GEARY
BY *Morton Amster*
HIS ATTORNEY

April 28, 1959 R. J. GEARY 2,884,022
PLANT-POTTING MACHINE
Filed Aug. 16, 1954 5 Sheets—Sheet 3

INVENTOR
ROBERT J. GEARY
BY Morton Amster
HIS ATTORNEY

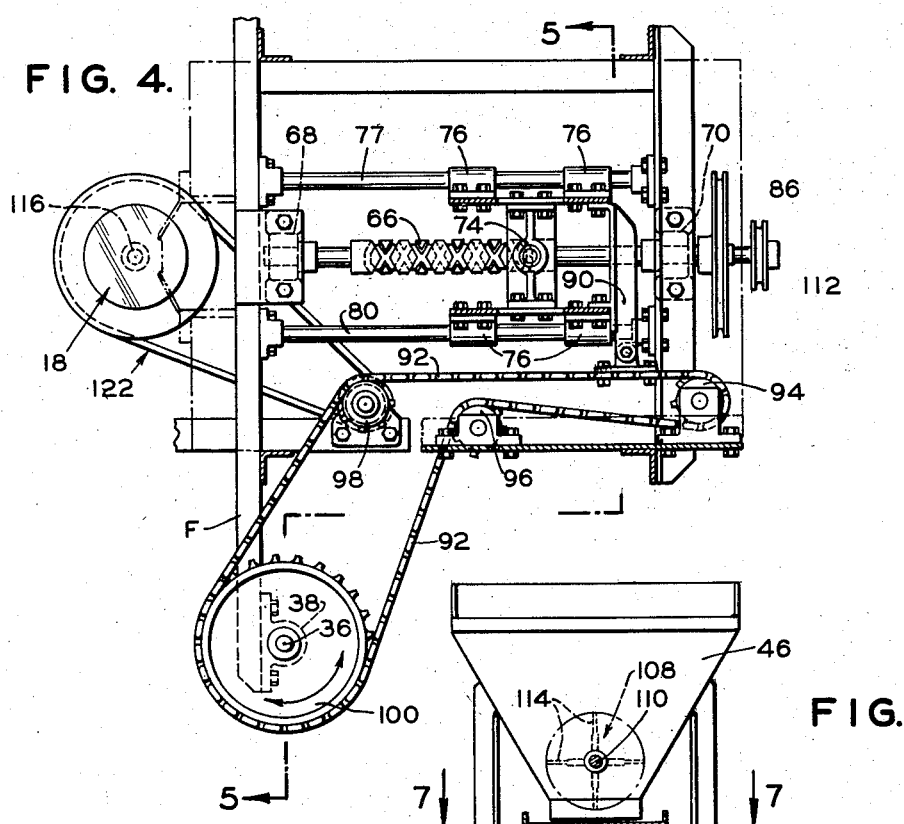
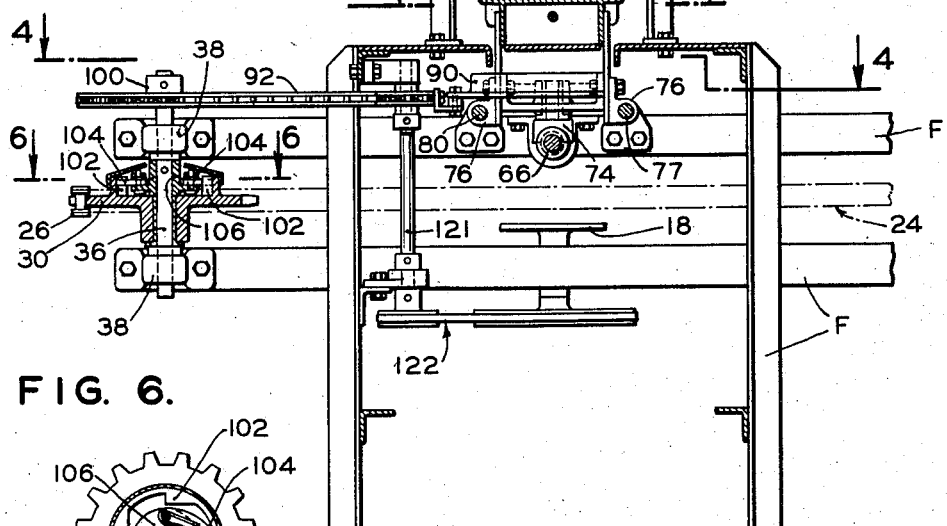
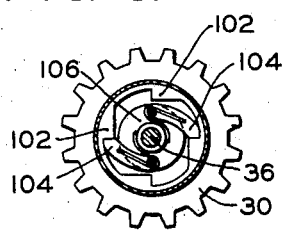

April 28, 1959 R. J. GEARY 2,884,022
PLANT-POTTING MACHINE
Filed Aug. 16, 1954 5 Sheets-Sheet 5

INVENTOR
ROBERT J. GEARY
BY
HIS ATTORNEY

United States Patent Office 2,884,022
Patented Apr. 28, 1959

2,884,022

PLANT-POTTING MACHINE

Robert J. Geary, Blue Point, N.Y.

Application August 16, 1954, Serial No. 450,057

14 Claims. (Cl. 141—72)

The present invention relates to a machine for loading and compacting material into a container, and particularly to automatic apparatus for periodically loading a predetermined quantity of a fill into a series of containers or pots and for compacting the fill about plant seedlings or cuttings manually placed in said containers or pots. Advantageously in accordance with the present invention, a wide variety of fill materials may be employed for potting horticultural and agricultural products without the fear of initially damaging said products or subsequently inhibiting proper growth.

A number of machines are known for potting plants on a semi-automatic or automatic basis in which a quantity of a fill material is molded about a plant or seedling by compression of a wetted mass of the fill material. Such machines, which usually employ earth which is sufficiently moist to be moldable into the shape of a pot or ball about the plant or seedling, exhibit a number of disadvantages and limitations, particularly from the standpoint of handling various types of fill materials, and in respect to the risk of damaging plants incident to potting.

Inherently such molding machines frequently require the regulation of the moisture content of the fill or mix. For example, when potting with sandy soil, the fill material must be wetted; when potting with clay-like soil, the fill material in many instances is too wet. Aside from the need of accurate control over the wetness of the fill, such molding operations require that the soil be preliminarily screened to remove stones or the like, which stones are likely to jam or foul the molding elements.

Apart from the above difficulties in molding, the known machines further are limited in the types of materials which may be employed therewith as a fill for potting. In such machines, following the rather critical molding operation, it has been the practice to drop the molded balls containing the plant into a pot of appropriate size. In the event that the compression is inaccurate, which may be due to improper moisture content or malfunctioning of the molding elements, the formed ball will not fit into the pot. Further, when using potting mixtures which are springy, such as vermiculite and peat moss, there is a tendency of such mixtures to expand after compression, further presenting a risk that the molded ball or shape will not fit into the container.

From the standpoint of the potted plant, the described compression techniques result in a compact non-porous mass about the plant which frequently precludes the normal growing function of the plant in that air is not allowed to reach its roots. Under these conditions, without taking precautions, it is not uncommon for such compression potted plants to become diseased and/or injured due to tearing of the fine root hairs.

Therefore, it is an object of the present invention to provide a plant-potting machine which obviates one or more of the aforesaid difficulties. Specifically, it is within the contemplation of the present invention to provide apparatus for automatically potting plants which may be used with a wide variety of filler materials, without extremely rigid controls, and with minimum risk of damaging the potted plants or inhibiting normal plant growth.

In accordance with an illustrative embodiment demonstrating features of the present invention, a plant-potting machine is provided which includes a loading station and a compacting station. The pot to be loaded is received at the loading station on a movable turntable or carrier which applies a periodic motion to the pot while a charge of an appropriate fill is gravity fed into the pot. The motion of the pot during the loading operation partially compacts the fill material about the plant or seedling without damage thereto and under circumstances simulating hand-filling. An intermittently operable conveyor is arranged to advance the pot to the compacting station wherein the pot is subjected to further periodic motion causing the fill material to be further compacted about the plant. Advantageously, the fill material need not have a particular moisture content and may be of springy materials such as vermiculite and peat moss.

The above and still further objects, features and advantages of the present invention will become apparent upon reference to the following detailed description of several presently preferred embodiments, when taken in conjunction with the accompanying drawings, wherein:

Figure 4 is a view taken substantially along the line 4—4 of Fig. 3 showing the details of the operating mechanisms for the reciprocating fill feeder, the turntable and the conveyor;

Fig. 5 is an elevational view taken substantially along the line 5—5 of Fig. 4 and looking in the direction of the arrows;

Fig. 6 is a sectional view taken substantially along the line 6—6 of Fig. 5 and showing the details of the pawl and ratchet coupling between the main drive and the conveyor;

Figure 1:
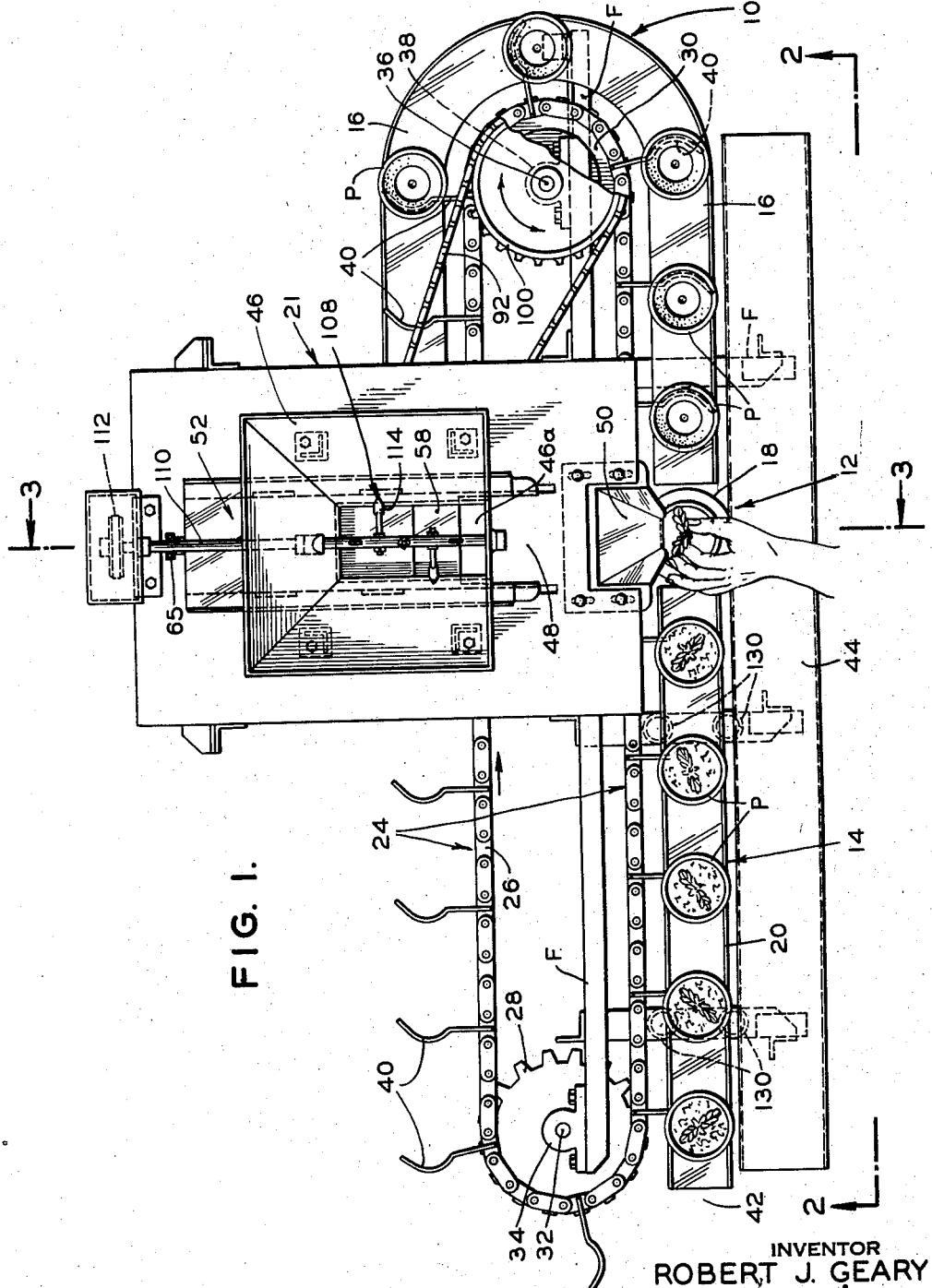
Figure 1 is a plan view of a plant-potting machine embodying the features of the present invention.

Referring now specifically to the drawings, there is shown therein a plant-potting machine illustrating and demonstrating the features of the present invention which generally includes a pot or container-loading station 10, a fill- and plant-loading station 12 and a compacting station 14. The pot-loading station includes a generally U-shaped track 16 along which pots or containers P are advanced toward the fill-loading station 12 which includes a turntable 18 in position to receive successive pots P from the feed track 16. The turntable 18 is arranged to impart compound movement to the pot or container P supported thereon which is to receive a charge of fill material from a fill delivery and measuring mechanism, generally designated by the numeral 21. At the compacting station 14 following the fill-loading station 12 is a further feed track or bed 20 which forms a continuation of the feed track 16 of the pot-loading station 10. The bed or track 20 is mounted for vibratory up and down movement such as to impact the fill about the plant P following automatic fill loading at the station 12.

The stations 10, 12, 14 and their respective operating mechanisms are supported on a frame generally designated by the letter F which includes upright and cross bars, as of angle iron. Extending longitudinally of the frame F is a horizontally disposed conveyor 24 which includes a continuous or endless link chain 26 trained about supporting sprockets 28, 30. The supporting sprocket 28 is an idler mounted on a stub shaft 32 and journaled within bearings 34; the supporting sprocket 30 is to be driven and is mounted on a stub shaft 36 journaled within bearings 38. The supporting sprocket 30 is driven from the main drive of the machine, through coordinating mechanisms which will be detailed hereinafter.

At spaced locations along the endless chain 26 of the conveyor 24 are carriers 40 each of which includes a curved gripping or seating part shaped to be engaged against the rear portions of successive pots P to advance the same along the track 16, onto the turntable 18, and then onto the vibratory track or bed 20 toward the take-off location 42. The spacing of the respective carriers 40 is such that upon indexing of the conveyor 24, successive pots P are moved through a stroke length sufficient to advance the leading pot from the track 16 onto the turntable during a first index interval, and to subsequently advance the pot from the turntable onto the trailing end of the vibratory feed bed 20.

As seen best in Figure 1 the feed track 16 extends horizontally and is of U-shaped configuration with its curved portion extending around the adjacent end of the conveyor and with one straight leg extending along the forward run of the conveyor toward the turntable 18. As previously pointed out the feed bed 20 forms a continuation of the forward leg of the feed track 16 such that a continuous path is provided about the machine for successive pots.

Projecting forwardly of the aligned track-forming elements 16, 18, 20 is a ledge 44 which serves as a rest or support for the arm of a worker placing seedlings or cuts in successive pots P arriving in the fill-loading position on the turntable 18.

Figure 3:
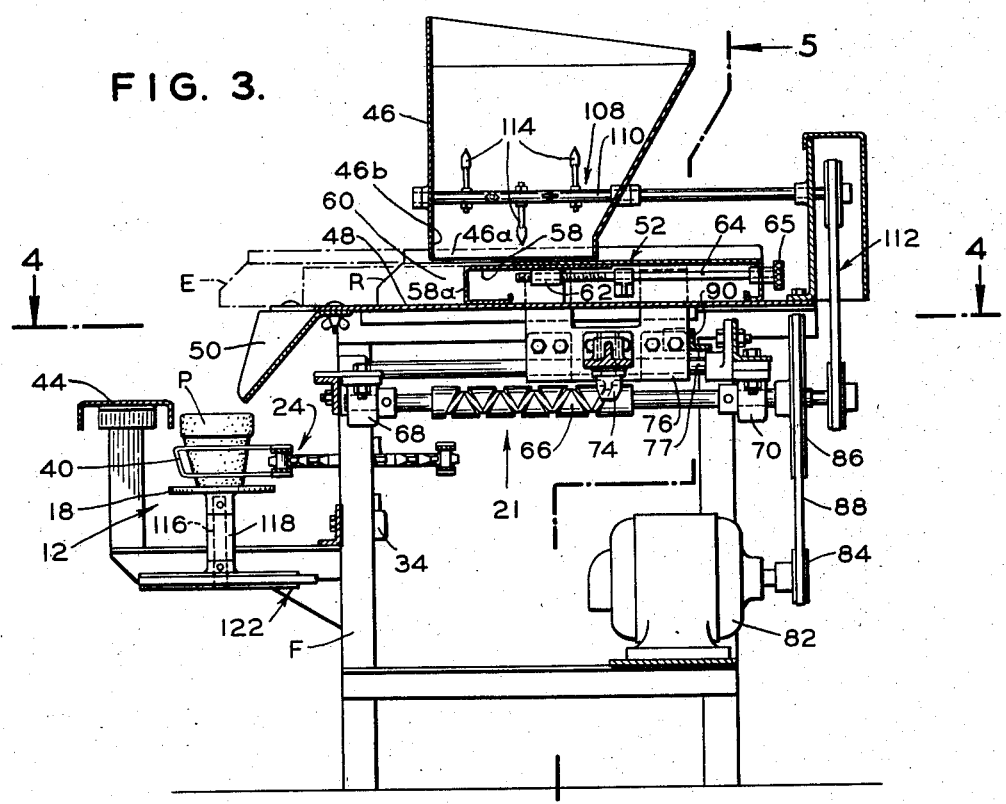
Figure 3 is a sectional view taken substantially along the line 3—3 of Figure 1 and showing the details of the fill-loading station.
Figure 7:
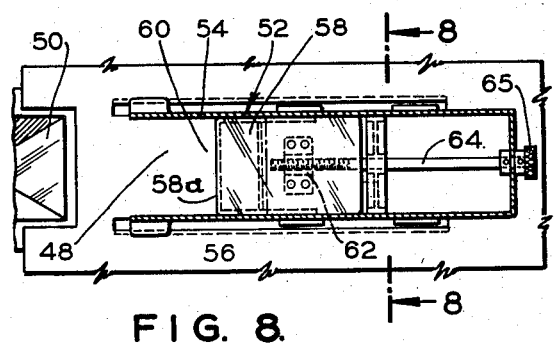
Fig. 7 is a fragmentary sectional view taken along line 7—7 of Fig. 5 and showing the structure for adjusting the stroke length of the said reciprocating fill feeder.
Figure 8:
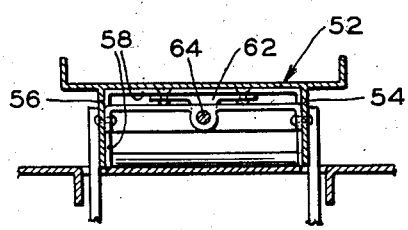
Fig. 8 is a sectional view taken substantially along line 8—8 of Fig. 7.

Referring now to Figures 3 to 5 inclusive, the details of the fill-delivery or feed mechanisms 21 will now be described. Specifically, a storage bin or hopper 46 extends generally above a feed trough 48 disposed transversely of the machine and having a downwardly directed funnel 50 at its forward end. As seen best in Figures 1 and 3 the funnel 50 is adjustable transversely of the machine such that the drop-off location of the fill material advanced along the feed trough 48 may be adjusted in relation to the supported position of the pot P at the fill-loading station 12. Mounted within the feed trough 48 is a feed ram 52 which is arranged for reciprocatory movement along the feed trough 48 through a predetermined linear stroke. As seen best in Figures 7 and 8 the feed ram 52 includes a pair of upright side plates 54, 56 which define the lateral boundaries of the feed trough 48 and a head 58 which is adjustable, longitudinally of and between the side plates 54, 56. The side plates 54, 56, the head 58 and the base of the feed trough 48 define a pocket 60 which receives fill material from the bin 46 through the open bottom 46a thereof. As seen in Figure 3 the ram 52 and its adjustable head 58 partially constricts the open bottom or mouth 46a of the bin 46 such that only a measured quantity of the fill material may be dropped by gravity into the pocket 60 forwardly of the head 58. By adjusting the leading face 58a of the head in relation to the forward wall 46b of the bin 46, the effective cross-section of the open mouth in the rearward position of the ram 52 may be adjusted such that the quantity of fill material may be controlled. To this end, and as seen in Figures 3 and 7, the head 58 carries a follower nut 62 in threaded engagement with a rotatable lead screw 64 having an adjustment knob 65 at the rearward end thereof. By turning the adjustment knob 65, the relative position of the head 58 within the slideway formed by the upright side plates 54, 56 can be varied to adjust the effective opening of the fill delivery mouth 46a.

Reciprocatory movement through a predetermined thrust is imparted to the ram 52 from the main drive of the machine through a reversely threaded lead screw 66 which extends transversely of the frame and is journaled in bearings 68, 70. The lead screw 66 includes a continuous spiral thread arranged to impart back and forth movement to the ram 52 between the retracted position, designated by the letter R in Figure 3 and shown in the full lines, and the extended position, designated by the letter E and shown by the dot-dash lines in Figure 3. The lead screw 66 is engaged by a follower nut 74 which is guided for movement along the lead screw by appropriate sleeve bearing 76 engaging guide rails or rods 77, 80. As seen best in Figure 3 the lead screw 66 is driven from a motor 82 having appropriate speed reduction gearing, the motor being coupled to the screw 66 by a pulley 84 on the motor shaft, a pulley 86 on the lead screw shaft, and a V-belt 88 trained about the pulleys.

The lead screw 66 and follower 74 are used to coordinate indexing of the conveyor 24 with delivering of successive pots P to the turntable 18 at the fill- and plant-loading station 12. To this end, the cross head of the follower nut 74 carries a lateral extension 90 which is secured to an endless coupling chain 92, seen in Figures 4 and 5 to extend horizontally of the machine, and is trained about idler sprockets 94, 96, a driven sprocket 98 for the turntable 18 and a further driven sprocket 100 for the conveyor index mechanism. The conveyor supporting sprocket 30 is loosely journaled on the stub shaft 36 while the sprocket 100 is keyed to the shaft 36. The sprocket 30 is formed with a ratchet track 102 (Fig. 6) which is engaged by spring biased pawls 104 carried on a collar 106 likewise keyed to the shaft 36. As is well understood the cooperating pawl and ratchet coupling 102, 104 is effective to impart motion to the conveyor supporting sprocket 30 in response to rotational movement of its driving pawls 104 in one direction. The spring-biased pawls 104 and the ratchet track 102 is arranged such that the sprocket 30 is driven in the clockwise direction about the stub shaft 36 in response to clockwise rotation of the pawl-supporting collar 106 keyed to the shaft 36. Such clockwise motion is imparted to the pawls 104 from the driven sprocket 100 during the return stroke of the follower 74, which corresponds to movement of the ram 52 of the material-feed mechanisms from the extended position E to the retracted position R. Thus the conveyor 24 is indexed through a stroke corresponding to the spacing between respective carriers 40 during the return stroke of the ram 52 to bring the next unfilled pot into the fill-loading station 12.

Preferably the bin 46 of the material feed mechanisms is provided with rotary mechanisms 108 which tend to loosen the soil within the bin 46. These rotary mechanisms 108 include a supporting shaft 110 extending through the bin 46 and driven through a belt and pulley coupling 112 from the pulley 86 of the main drive coupling 84, 86, 88. On the shaft 110 are radially extending and longitudinally spaced fingers 114 appropriately shaped to provide the required loosening action of the fill material. In that the motor 82 is continuously operated during the drive of the machine, the shaft 110 continuously rotates to effect the desired loosening.

The turntable 18 at the fill-loading station 12 is supported on a vertically extending shaft or axle 116 which is journaled in a sleeve bearing 118 carrying on a bracket 120 fixed to the agitating bed or track 20 of the compacting station 14. The turn-table 18 is rocked about its supporting shaft 116 with a back and forth limited arcuate movement through a drive from the cooperating lead screw 66 and follower 74. To this end the sprocket 98, seen best in Figure 4, is fixed to an upright shaft 121 which is journaled on the frame F of the machine and is coupled at its lower end by a pulley and V-belt drive 122 to the shaft 116. The arrangement of the V-belt drive 122 to the shaft 116 is such that limited up and down movement may be imparted to the shaft 116, for a reason which will subsequently become apparent.

Figure 2:
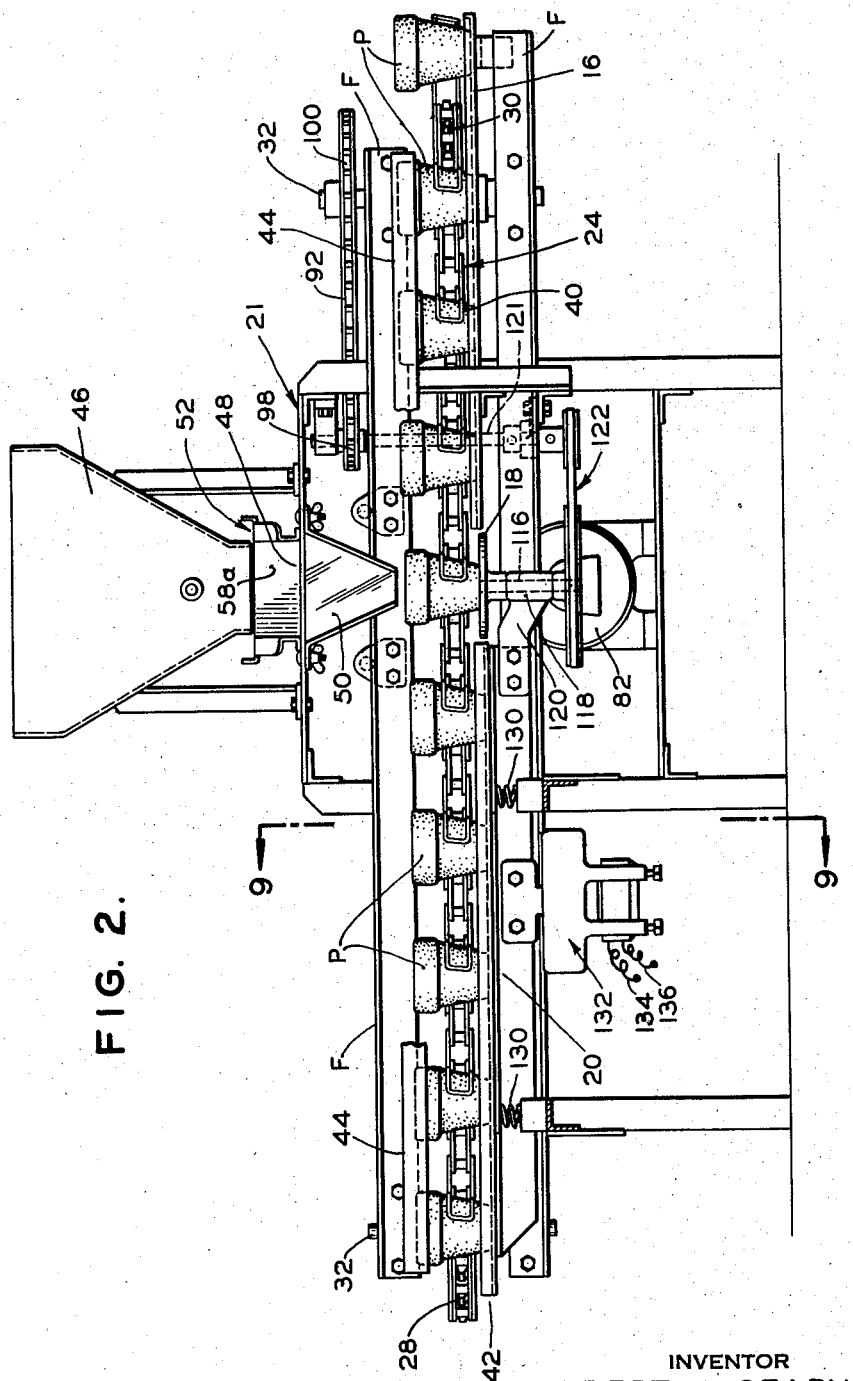
Figure 2 is an elevational view taken along line 2—2 of Figure 1 and looking in the direction of the arrows.
Figure 9:
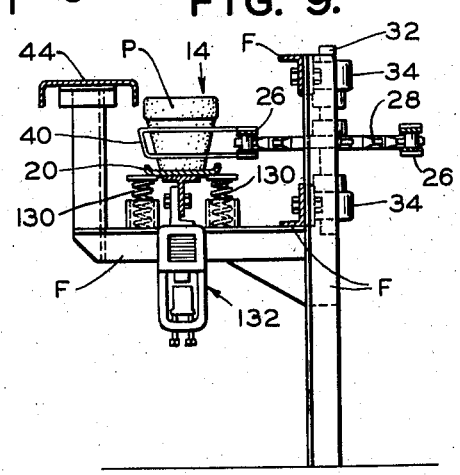
Fig. 9 is an elevational view taken along line 9—9 of Fig. 2 and showing the details of the impacting station.

Referring now specifically to Figures 1, 2 and 9, the details of the fill-compacting station 14 will be described. The compacting station 14 includes the horizontal bed or track 20 which is supported on a spring mount or suspension 130. The spring mount 130 is periodically placed in compression by means of an electrical vibrator 132 of well-known construction having terminals 134, 136 for connection to a suitable source of line potential. The vibrator 132 includes a solenoid coil and plunger and imparts up and down motion to the table at a rate determined by the cyclic variations of the line current. Concurrent with the up and down motion of the bed 20, the turntable 18 likewise moves up and down in that the support for the turntable is on the bed or track 20. As previously pointed out, the driving connection to the turntable 18 is such that this limited up and down movement may be imparted thereto without disturbing the rocking-drive connection from the follower 74.

In order to facilitate a more thorough understanding of the invention, a typical cycle of operations will now be described:

Upon energization of the motor 82 from the line, the fill-loosening mechanisms 108 are placed in operation, and the main lead screw 66 begins the drive of the follower 74 through the forward stroke to advance the ram 52 of the reciprocatory feed mechanism 21 through its linear stroke from the retracted position R to the extended position E. This stroke advances fill material lying within the pocket 60, and having dropped from the bin or hopper 46, toward the drop-off funnel 50 which overlies and extends downwardly towards the empty pot P received on the turntable 18 incident to the previous indexing of the conveyor 24. During delivery of the charge of fill material to the empty pot at the fill-loading station 12, the operator manually holds the plant seedling or cutting in position within the pot P to be surrounded by the fill material. During delivery of the fill material to the pot, the turntable 18 is being rocked back and forth in that it is driven from the lead screw follower 74; the turntable 18 is rocked in one direction in response to the forward movement of the follower 74 along the lead screw 66 and is rocked in the opposite direction in response to rearward movement of the follower 74. Concurrent with the rocking motion of the turntable 18, vibratory up and down motion is imparted thereto through its connection to the compacting bed or table 20 which is likewise energized at the start of the operation by connection of the terminals 134, 136 of the electrical vibrator 132 to the line potential.

As the lead screw follower 74 begins its return stroke along the reversely threaded lead screw 66 corresponding to movement of the ram 52 from the extended position E to the retracted position R, clockwise motion is imparted to the driving sprocket 100 for the conveyor index mechanisms, as seen in Figures 4, 5 and 6, to thus drive the spring-biased pawls 104 against the track 102 and indexing the conveyor through the distance corresponding to the spacing between successive pots. Thus the filled pot with the plant or seedling therein is removed by positive carrying action of the fingers or carriers 40 onto the vibratory table 20 of the compacting station 14 and the next empty pot is delivered to the turntable 18 for filling.

In the event that the charge being delivered to the pot is too great or too small or that the pot sizes vary, the amount of charge may be readily adjusted by longitudinal movement of the head 58 of the ram assembly 52 through turning of the adjustment knob 65 of the lead screw 64.

Figure 10:
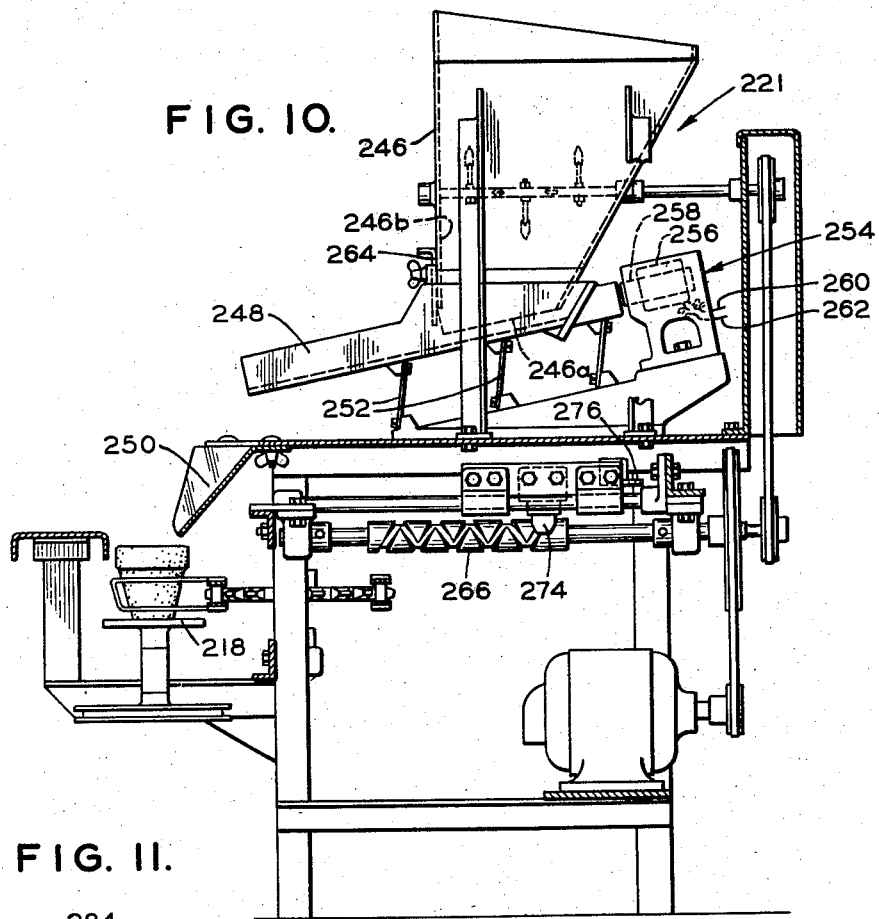
Fig. 10 is an elevational view of a modified plant-potting machine employing further features of the present invention.
Figure 11:
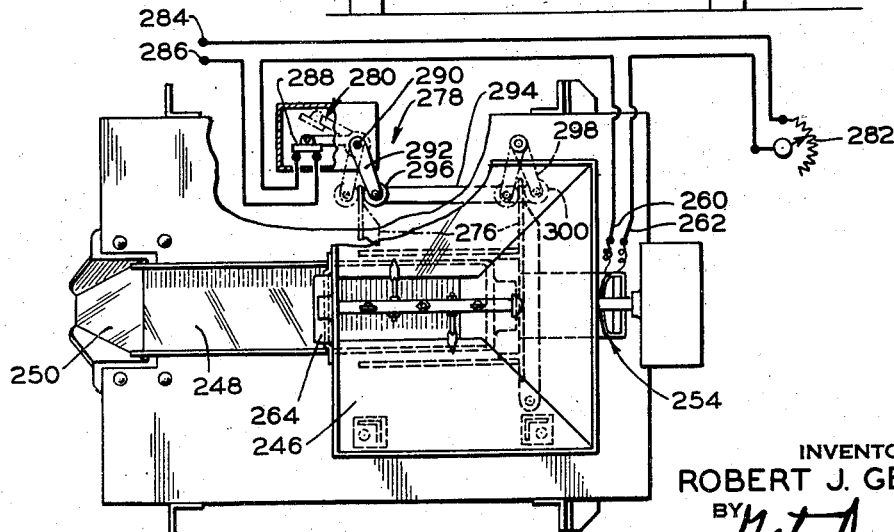
Fig. 11 is a plan view, wtih parts broken away, of the modified plant-potting machine illustrated in Fig. 10.

Referring now to Figures 10 and 11, there is shown a modified form of plant-potting machine illustrating further principles of the present invention. The modified form shown in Figures 10 and 11 is the same as the form illustrated in detail in Figures 1 to 9, inclusive, except that the mechanically-driven, reciprocating-type fill feeding mechanisms 21 are replaced by an electrically-operated, vibratory-type of fill feeding mechanism 221. Accordingly only the modified feeding mechanisms 221 will be described here in detail. In lieu of the feed trough 48 with the reciprocating ram 52 therein, the electromechanical form of feeder includes an inclined trough 248 having its lowermost or forward end over the adjustable funnel 250 which is directed downwardly toward the pot supported on the turntable at the loading station. The trough 248 is mounted for vibratory back and forth movement by mounting springs 252 which extend parallel to each other and are rigidly fixed between the frame and the trough 248. Rearwardly of the inclined trough 248 is an electrically-actuated vibrating device 254 which periodically impacts the feed trough 248 such that material fed to the trough 248 is moved therealong towards the funnel 250. The vibrating device 254 which is of a well-known construction includes a coil 256, a magnetic armature 258 and appropriate energization terminals 260, 262 for the coil. Such units are commercially purchased on the open market and accordingly further description will be dispensed with.

The hopper or bin 246 is of the same general construction as that shown in the embodiment of Figures 1 to 9 inclusive, including an open bottom 246a. The front wall 246b of the hopper terminates short of the bottom to form a lateral opening exit for the fill material within the hopper, which exit or port may be selectively constricted by an adjustable plate 264. Thus, there is a positive control over the amount of material being delivered to the trough for advance towards the pot on the turntable.

Energization of the vibratory feeder 221 is controlled from the main lead screw 266 which is engaged by the follower 274. Once again the follower 274 is employed to effect rocking motion of the turntable 218 and to periodically index the conveyor. The lead screw follower 274 includes a lateral extension 276 which is effective through a linkage system 278 and a toggle switch 280 to complete an energization circuit for the solenoid of the vibrator actuator 254. Specifically the input lines 284, 286 for the solenoid control vibrator 254 are connected in series with a rheostat 282 the solenoid coil and the contactor 288 of the toggle switch 280. The contactor 288 of the toggle switch 280 is movable between the full and the dot-dash line positions illustrated in Figure 11 in response to movement of the linkage 278 between the full and dot-dash line positions. The contactor 288 is pivoted at 290 and connected to link 292 which in turn is pivotally connected to the link 294 at a contacting roller 296. The rearward end of the link 294 is pivotally connected to a further link 298 at a further contacting roller 300. At the end of the forward stroke of the extension 276, the extension 276 engages the roller 296 to displace the same from the full line position of Fig. 11 to the broken line position illustrated therein whereupon the contactor 288 of the toggle switch 280 is open. Thus the vibrator is deenergized at the end of the forward stroke which corresponds to the end of the filling interval. At the end of the rearward stroke of the extension 276, the extension 276 engages the roller 300 to displace the link 298 from the dot-dash line position of Fig. 11 to the broken line position, thus again restoring the contactor 288 to the closed position illustrated in Fig. 11. It will be appreciated thus that during the forward travel of the follower 274 along lead screw 276, the circuit is completed for the vibrator 254 and material is delivered along the trough 248 to the pot which has been moved into the fill- and plant-loading station. However, during the return stroke of the follower 274, corresponding to indexing of the conveyor, the delivery of fill material is interrupted. Thus there is provided an electromechanical means for periodically delivering a required quantity of fill material to the pot at the loading station.

From the detailed description of the several forms of the present invention, it will be appreciated that a wide variety of fill materials may be employed with the plant-potting machine of the present invention; extreme care or precaution to avoid stones in the fill material is not necessary and the moisture content of the fill is not critical. In that the mechanisms described are positive acting and are relatively simple, the possibilities of fouling or jamming of the operating mechanisms is minimized.

The filling and compacting operations simulate to a great degree hand filling of the pots which is to advantage in that a compacted non-porous mass is not formed about the plant which might inhibit its normal growth, and in fact cause plant disease. The degree of compacting may be varied by control over the compacting motions applied to the pot at the fill-loading station 12 as well as at the compacting station 14. For example, by making the bed or track 20 at the compacting station 14 comparatively long such that pots are maintained thereon for a relatively long period before being advanced to the take-off location 42, the fill material may be tightly compacted about the roots. The compacting action can be further enhanced by imparting greater up and down motion to the bed or track 20 in accordance with practices well understood.

Although I have illustrated and described two presently preferred forms of the present invention, it is expressly understood that numerous modifications may be made. In certain instances, some features of the invention will be used without the corresponding use of other features and accordingly the appended claims should be interpreted consistent with the scope and spirit of the instant disclosure.

What I claim is:

1. A plant-potting machine comprising a loading station, a turntable at said loading station rotatable about a vertical axis and adapted to receive a pot thereon, feed means at said loading station for dropping a predetermined quantity of a fill into the pot on said turntable, and means for rotating said turntable about said vertical axis concurrent with delivery of said predetermined quantity of fill to said pot, said feed means including a storage bin, a delivery trough fed from said storage bin and having a drop-off end disposed above said turntable, and means for advancing the fill along said delivery trough toward said drop-off end.

2. A plant-potting machine comprising a loading station, a turntable at said loading station rockable about a vertical axis and adapted to receive a pot thereon, feed means at said loading station for dropping a predetermined quantity of a fill into the pot on said turntable, means for rocking said turntable about said vertical axis concurrent with delivery of said predetermined quantity of fill to said pot, and means for displacing said turntable along said vertical axis concurrent with delivery of said predetermined quantity of fill to said pot.

3. A machine for potting plants including a loading station, a compacting station, and conveying means for moving successive pots through said loading and compacting stations, said loading station including a support for receiving successive pots, means for rocking said support about a vertical axis, and means for delivering a measured quantity of a fill to said successive pots, said compacting station including a table receiving filled pots thereon, means for imparting cyclic up and down motion to said table whereby the fill in successive pots is compacted about a plant placed therein at said loading station, and means operatively connecting said support to said table for cyclic up and down motion with said table.

4. A machine for loading and compacting fill about a plant placed in a pot comprising a loading station including a support turntable about a vertical axis and fill-delivering means for gravity loading a pot received on said support, a compacting station following said loading station and adapted to receive filled pots, said compacting station including a table mounted for vibratory movement, an intermittently indexed conveyor for advancing pots successively through said loading and compacting stations, and operating means for said conveyor and said fill-delivering means coordinated to actuate said fill-delivering means in timed relation to indexing of said conveyor whereby successive pots arriving at said loading station receive a charge of said fill.

5. A machine for loading and compacting a fill about a plant placed in a pot comprising a loading station including a support, means for rocking said support back and forth about a vertical axis and a fill-delivering mechanism for gravity loading a pot on said support, a compacting station following said loading station and adapted to receive filled pots, said compacting station including a table means for imparting vibratory movement to said table, an intermittently indexed conveyor for advancing pots successively through said loading and compacting stations, and operating means for said conveyor and said fill-delivering means coordinated to actuate said fill-delivering means in timed relation with indexing of said conveyor whereby successive pots arriving at said loading station receive a charge of said fill.

6. A machine for delivering a measured charge of fill to successive containers advanced through a loading station and for compacting said fill about plants placed in said containers comprising an endless conveyor for advancing said containers through said loading station, fill-delivery means at said loading station for periodically loading a measured charge of fill into each of said containers, a drive, coupling means connecting said drive to said fill-delivery means, means controlled from said coupling means for indexing said conveyor during the intervals between periodic loading of said fill-delivery means, and a compacting station following said loading station including a vibratory table positioned to receive successive containers advanced through said loading station.

7. A machine for delivering a measured charge of fill to successive containers advanced through a loading station and for compacting said fill about plants placed in said containers comprising an endless conveyor for advancing successive containers through said loading station, a rockable turntable at said loading station, fill-delivery means at said loading station for periodically delivering a measured charge of fill to containers supported on said rockable turntable, a drive, coupling means connecting said drive to said fill-delivery means, means controlled from said coupling means for indexing said conveyor during the intervals between periodic operation of said fill-delivery means, and a compacting station following said loading station including a vibratory table positioned to receive successive containers advanced through said loading station, and means operative to impart up and down movement to both said vibratory table and said turntable.

8. A machine for delivering a measured charge of fill to successive containers advanced through a loading station and for compacting said fill about plants placed in said containers comprising a conveyor for advancing successive containers through said loading station, reciprocatory fill-delivery means at said loading station movable through a predetermined forward stroke for periodically loading a measured charge of fill to said containers, a drive, coupling means including a lead screw and follower connecting said drive to said fill-delivery means, and means including a one way drive connection controlled from said coupling means for indexing said conveyor during the return stroke of said fill-delivery means.

9. A machine for delivering a measured charge of fill to successive containers advanced through a loading station and for compacting said fill about plants placed in successive containers comprising a conveyor for advancing successive containers through said loading station, fill-delivery means at said loading station movable through a forward stroke for delivering said measured charge of fill to said containers, a drive, means including a lead screw and follower connecting said drive to said fill-delivery means, means controlled from said lead screw for indexing said conveyor during the return stroke of said fill-delivery means, and a compacting station following said loading station and including a vibratory table positioned to receive successive containers advanced through said loading station.

10. A machine for filling containers comprising an intermittently indexed conveyor for moving successive spaced apart containers along a feed path, a turntable along said feed path receiving and supporting successive containers, gravity feed means above said turntable for periodically delivering a charge of fill to successive containers on said turntable, a compacting table along said feed path following said turntable, means coordinated with said gravity feed means for cyclically moving said turntable whereby said charge is compacted during delivery to successive containers, and means for cyclically moving said compacting table whereby said charge is further compacted after delivery to successive containers.

11. A machine for filling containers comprising a conveyor for moving successive spaced apart containers along a feed path, a turntable along said feed path receiving and supporting successive containers, gravity feed means above said turntable for delivering a charge of fill to successive containers on said turntable, said gravity feed means including a feed trough terminating in an end over said turntable and a pusher member movable through a predetermined stroke for advancing said charge of fill to said end of said feed trough, a compacting table along said feed path following said turntable, means for cyclically moving said turntable whereby said charge is compacted during delivery to successive containers, and means for cyclically moving said compacting table whereby said charge is further compacted after delivery to successive containers.

12. A machine for filling containers comprising an intermittently indexed conveyor for moving successive spaced apart containers along a feed path, a turntable along said feed path receiving and supporting successive containers, gravity feed means above said turntable for delivering a charge of fill to successive containers on said turntable, said gravity feed means including a feed trough terminating in an end overlying said turntable, and a vibratory feed bed in said trough and cyclically movable to advance said charge of fill to said end of said feed trough, a compacting table along said feed path following said turntable, means for cyclically moving said turntable whereby said charge is compacted during delivery to successive containers, and means for cyclically moving said compacting table whereby said charge is further compacted after delivery to successive containers.

13. A machine for loading and compacting a fill about a plant in a pot comprising a loading station including a rockable support movable about a vertical axis and a fill-delivering mechanism for gravity loading a pot received on said support, a compacting station following said loading station and adapted to receive successive filled pots, said compacting station including a horizontal-extending table, a spring mounting supporting said table for up and down movement, solenoid controlled activating means operatively connected to said table for imparting movement thereto, an intermittently indexed conveyor for advancing pots successively through said loading and compacting stations, and operating means for said conveyor and said delivery means coordinated to actuate said fill-delivering means in timed relation to indexing of said conveyor whereby successive pots arriving at said loading station receive a charge of a fill.

14. A machine for loading and compacting a fill about a plant placed in a pot comprising a loading station including a support turntable about a vertical axis and a reciprocatory fill-delivering mechanism for gravity loading a pot received on said support, a compacting station following said loading station and adapted to receive successive filled pots, said compacting station including a table mounted for vibratory movement, an intermittently indexed conveyor for advancing pots successively through said loading and compacting stations, and operating means for said conveyor and said delivery means coordinated to actuate said fill-delivering means in timed relation to indexing of said conveyor whereby successive pots arriving at said loading station receive a charge of a fill, said operating means including a drive motor, a rotatable double threaded lead screw operatively connected to said drive motor, a follower engaging said lead screw and operatively connected to said fill-delivering mechanism for imparting reciprocatory movement thereto, and a motion transmitting linkage including a pawl and ratchet connection operatively connected between said follower and said conveyor.

References Cited in the file of this patent

UNITED STATES PATENTS

| | | |
|---|---|---|
| 574,444 | Nickerson | Jan. 5, 1897 |
| 1,075,534 | Ash | Oct. 14, 1913 |
| 1,313,301 | Kiefer | Aug. 19, 1919 |
| 1,664,913 | Bewley | Apr. 3, 1928 |
| 2,415,528 | Peebles et al. | Feb. 11, 1947 |
| 2,518,223 | Christiansen | Aug. 8, 1950 |
| 2,610,726 | Howard | Sept. 16, 1952 |

FOREIGN PATENTS

| | | |
|---|---|---|
| 160,972 | Great Britain | Apr. 7, 1921 |